US008944199B2

(12) United States Patent
Fukunaga et al.

(10) Patent No.: US 8,944,199 B2
(45) Date of Patent: Feb. 3, 2015

(54) WORKING VEHICLE

(71) Applicant: Kubota Corporation, Osaka-shi (JP)

(72) Inventors: Tomofumi Fukunaga, Sakai (JP); Keishiro Nishi, Sakai (JP); Hiroo Fujimoto, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/786,514

(22) Filed: Mar. 6, 2013

(65) Prior Publication Data

US 2014/0083784 A1 Mar. 27, 2014

(30) Foreign Application Priority Data

Sep. 27, 2012 (JP) ................................ 2012-215240

(51) Int. Cl.
*B60K 1/04* (2006.01)
*B60K 6/40* (2007.10)
*B60K 11/06* (2006.01)
*B60H 1/00* (2006.01)
*B60K 1/00* (2006.01)

(52) U.S. Cl.
CPC ... *B60K 6/40* (2013.01); *B60K 1/04* (2013.01); *B60K 11/06* (2013.01); *B60H 1/00378* (2013.01); *Y10S 903/903* (2013.01); *B60K 2001/003* (2013.01); *B60K 2001/0405* (2013.01); *B60Y 2200/221* (2013.01)
USPC .. 180/68.5; 180/89.12; 296/210; 296/190.09; 903/903

(58) Field of Classification Search
CPC .................. B60K 11/08; B60K 11/00; B60K 2001/0405; B60R 16/04; B60H 1/00378; B60H 2001/00235
USPC ................... 180/68.1, 68.2, 68.5, 89.12, 900; 296/210, 185.1, 212, 190.01, 190.09
See application file for complete search history.

(56) References Cited

U.S. PATENT DOCUMENTS

| | | | | |
|---|---|---|---|---|
| 4,641,502 A | * | 2/1987 | Aldrich et al. | 62/244 |
| 4,721,031 A | * | 1/1988 | Nakata et al. | 454/121 |
| 5,544,929 A | * | 8/1996 | Nagai | 362/492 |
| 5,913,566 A | * | 6/1999 | Stauffer et al. | 296/190.1 |
| 5,921,619 A | * | 7/1999 | Cederberg et al. | 296/190.09 |
| 6,397,965 B1 | * | 6/2002 | McFarlane et al. | 180/298 |
| 7,377,848 B2 | * | 5/2008 | Voit et al. | 454/158 |
| 7,571,785 B2 | * | 8/2009 | Ferdows | 180/68.1 |
| 2011/0030406 A1 | * | 2/2011 | Ichikawa et al. | 62/244 |
| 2011/0140483 A1 | * | 6/2011 | Veenstra | 296/210 |
| 2012/0247846 A1 | * | 10/2012 | Ichikawa | 180/65.21 |
| 2013/0139921 A1 | * | 6/2013 | Doi et al. | 137/899 |

FOREIGN PATENT DOCUMENTS

JP 2009154826 A 7/2009

* cited by examiner

*Primary Examiner* — John Walters
*Assistant Examiner* — Brian Swenson
(74) *Attorney, Agent, or Firm* — The Webb Law Firm

(57) ABSTRACT

The present invention provides a working vehicle, including a power source unit, an air intake passage, and an air exhaust passage all of which are arranged inside a roof portion, wherein the power source unit is disposed in a portion close to a center in a vehicle body width direction, the air intake passage guides air taken from an air intake port that is provided in a center portion in the vehicle body width direction, to the power source unit, and the air exhaust passage is bent in a planar view such that air supplied to the power source unit flows in a bent manner toward an air exhaust port that is provided in one end portion in the vehicle body width direction.

7 Claims, 8 Drawing Sheets

WORKING VEHICLE

BACKGROUND OF THE INVENTION

1. Field of the Invention

The present invention relates to a working vehicle, including a power source unit, an electrically-driven motor that operates with electrical power from the power source unit, and a traveling transmission system to which motive power of the electrically-driven motor is transmitted.

2. Description of the Related Art

As this sort of working vehicle, there is a vehicle in which an accommodation box accommodating the power source unit is installed on an upper face of a roof portion of a vehicle body, and a waterproof cover that covers upper and side portions of the accommodation box is provided in order to prevent rainwater and the like from entering the accommodation box (see JP2009-154826A, for example). It is required for the power source unit that is accommodated in the accommodation box to be provided with a cooling mechanism in order to prevent the temperature from increasing.

Thus, in the working vehicle according to JP2009-154826A, a gap is provided between the waterproof cover and the roof portion, air outside the waterproof cover is taken via this gap into the waterproof cover, this air is supplied via an air intake duct and an air intake port into the accommodation box, and, thus, the power source unit is cooled down. The air that has cooled down the power source unit is guided via an air exhaust port and an air exhaust duct so as to be exhausted out of the accommodation box, and is then guided via the gap between the waterproof cover and the roof portion so as to be exhausted out of the waterproof cover.

SUMMARY OF THE INVENTION

In the working vehicle according to JP2009-154826A, not only the power source unit, but also the cooling mechanism such as a channel and a fan for causing air to flow is provided on the upper portion of the roof portion in order to cool down the power source unit. Accordingly, the power source unit and the cooling mechanism are projected above the roof portion, causing a problem in which the vehicle height of the vehicle body increases.

Thus, it is also conceivable to arrange the power source unit and the cooling mechanism inside the roof portion. However, for example, other constituent components are also arranged in the roof portion. Accordingly, the power source unit and the cooling mechanism have to be arranged in a limited space of the roof portion so as not to cause interference with other constituent components, and, thus, it is difficult to arrange the power source unit and the cooling mechanism in the roof portion.

For example, in a working vehicle such as a tractor, an air conditioning apparatus for altering the condition of air in a cabin in which a driver rides may be provided in the roof portion. In this tractor, when arranging the air conditioning apparatus and the power source unit in the roof portion, there is a demand for both the air conditioning apparatus and the power source unit to be arranged in a portion as close as to the center in the vehicle body width direction. In order to satisfy this demand, for example, it is conceivable to arrange the power source unit and the air conditioning apparatus one in front of the other in the vehicle body front-to-rear direction. However, in this case, a cooling mechanism that supplies air and cools down the power source unit disposed in a portion close to the center in the vehicle body width direction is provided, and, thus, this cooling mechanism has to be disposed so as not to cause interference with the air conditioning apparatus, and how the cooling mechanism is disposed with respect to the air conditioning apparatus is important. For example, if the air conditioning apparatus and the cooling mechanism are arranged one above the other in the vertical direction, the problem that the vehicle height of the vehicle body increases becomes apparent.

Thus, there is a strong demand for a working vehicle in which a power source unit and a cooling mechanism that cools down the power source unit are provided in a roof portion, and the power source unit and the cooling mechanism are arranged at proper positions, so that the vehicle height of the vehicle body can be reduced to all extent possible.

The present invention is directed to a working vehicle, comprising;

a power source unit;

an electrically-driven motor that operates with electrical power from the power source unit;

a traveling transmission system to which motive power of the electrically-driven motor is transmitted;

a cabin in which a driver rides and that has a roof portion;

an air intake passage through which air outside the cabin is supplied to the power source unit; and an air exhaust passage through which air supplied to the power source unit is exhausted out of the roof portion;

wherein the power source unit, the air intake passage, and the air exhaust passage are arranged inside the roof portion, the power source unit is disposed in a portion close to a center in a vehicle body width direction, the air intake passage guides air taken from an air intake port that is provided in a center portion in the vehicle body width direction, to the power source unit, and the air exhaust passage is bent in a planar view such that air supplied to the power source unit flows in a bent manner toward an air exhaust port that is provided in one end portion in the vehicle body width direction.

With this feature, in the roof portion, the power source unit can be disposed in a portion close to the center in the vehicle body width direction, and, thus, the air intake passage through which air for cooling down the power source unit is supplied and the air exhaust passage through which air supplied to the power source unit is exhausted also can be arranged in the roof portion. Furthermore, it is sufficient for the air intake passage to guide air from the air intake port that is provided in the center portion in the vehicle body width direction to the power source unit that is provided in a portion close to the center in the vehicle body width direction, and, thus, its shape and configuration can be made simple. Furthermore, the air exhaust passage causes air to flow in a bent manner from the power source unit that is provided in a portion close to the center in the vehicle body width direction to the air exhaust port that is provided in one of the end portions in the vehicle body width direction, and, thus, an empty space can be formed behind that bent portion. Accordingly, other constituent components included in the roof portion can be arranged in this empty space, and, thus, the cooling mechanism can be disposed such that the other constituent components and the cooling mechanism are not positioned one above the other in the vertical direction. In this manner, the power source unit and the cooling mechanism for cooling down the power source unit are arranged in the roof portion, the power source unit and the cooling mechanism are arranged at proper positions while avoiding interference with other constituent components, and, thus, the vehicle height of the vehicle body can be reduced to all extent possible.

In this configuration, it is preferable that the roof portion has a projection portion that is projected outward in the vehicle body width direction from the cabin in a planar view, and the air exhaust port exhausts air downward in the projection portion of the roof portion.

With this feature, the air exhaust port exhausts air downward in the projection portion of the roof portion, and, thus, rainwater and the like can be prevented from entering the air exhaust passage via the air exhaust port.

In this configuration, it is preferable that wherein the roof portion is provided with an air conditioning apparatus that supplies air-conditioned air to the cabin, the air conditioning apparatus is disposed in a portion close to the center in the vehicle body width direction behind the power source unit in a vehicle body front-to-rear direction, and the air exhaust passage is bent away from the air conditioning apparatus in a planar view.

With this feature, the demand for the power source unit and the air conditioning apparatus to be arranged in a portion close to the center in the vehicle body width direction can be satisfied, and, furthermore, the air exhaust passage can be provided so as to be bent away from the air conditioning apparatus in a planar view. Accordingly, the air exhaust passage and the air conditioning apparatus are hardly positioned one above the other in the vertical direction, and, thus, the vehicle height of the vehicle body can be reduced to all extent possible.

In this configuration, it is preferable that air-conditioned air supply passages that supply air-conditioned air whose condition has been altered by the air conditioning apparatus to the cabin are provided in both end portions in the vehicle body width direction of the roof portion, a support member that supports the power source unit is positioned between the air-conditioned air supply passages so as to be lower than an upper end portion of the air-conditioned air supply passages in a planar view, and the power source unit is supported on an upper portion of the support member.

With this feature, as the arrangement position of the power source unit, a space between the air-conditioned air supply passages in a planar view can be effectively used, and, thus, the power source unit and the air-conditioned air supply passages can be properly arranged while avoiding interference therebetween. Moreover, the support member that supports the power source unit thereon is positioned so as to be lower than the upper end portion of the air-conditioned air supply passages, and, thus, the height of the portion of the power source unit projected upward can be reduced to all extent possible with respect to the air-conditioned air supply passages. Accordingly, the vehicle height of the vehicle body can be reduced to all extent possible.

In this configuration, it is preferable that the roof portion has an inner roof and an outer roof, the outer roof is placed so as to cover an upper portion of the inner roof, so that a space for accommodating the power source unit is formed between the outer roof and the inner roof, and the air intake port and the air exhaust port are arranged in the outer roof, the air intake passage has an inner channel section that is disposed on the inner roof side and an outer channel section that is disposed on the outer roof side, the air exhaust passage has an inner channel section that is disposed on the inner roof side and an outer channel section that is disposed on the outer roof side, and when the outer roof is placed so as to cover the upper portion of the inner roof, the inner channel section and the outer channel section of the air intake passage are connected to each other, and the inner channel section and the outer channel section of the air exhaust passage are connected to each other.

With this feature, merely by placing the outer roof so as to cover the upper portion of the inner roof, an accommodation space for the power source unit can be formed between the outer roof and the inner roof. If the outer roof has been attached so as to cover the upper portion of the inner roof, the connecting operation that connects the inner channel sections and the outer channel sections of the air intake passage and the air exhaust passage at the time of attachment requires much efforts when performing the connecting operation, such as requiring to temporarily lift the outer roof upward when performing the connecting operation. On the other hand, according to the above-described feature, the inner channel sections and the outer channel sections of the air intake passage and the air exhaust passage are connected merely by placing the outer roof so as to cover the upper portion of the inner roof. Accordingly, the connecting operation for connecting the inner channel sections and the outer channel sections of the air intake passage and the air exhaust passage can be made simple. As a result, the operation that installs the roof portion can be made simple, and the time required for this operation can be shortened.

In this configuration, it is preferable that a connecting portion between the inner channel section and the outer channel section of the air intake passage and a connecting portion between the inner channel section and the outer channel section of the air exhaust passage are inclined with respect to a placement direction in which the outer roof is placed on the upper portion of the inner roof.

With this feature, when connecting the inner channel sections and the outer channel sections of the air intake passage and the air exhaust passage, even if the inner channel sections and the outer channel sections are displaced from each other, the channel sections can be connected by being guided to proper positions along the inclined connecting portions. Accordingly, the connecting operation can be made simple, and the connecting operation can be properly performed.

DETAILED DESCRIPTION OF THE PREFERRED EMBODIMENTS

Hereinafter, an example of the present invention will be described with reference to the drawings.
[Overall Configuration]

Figure 1:
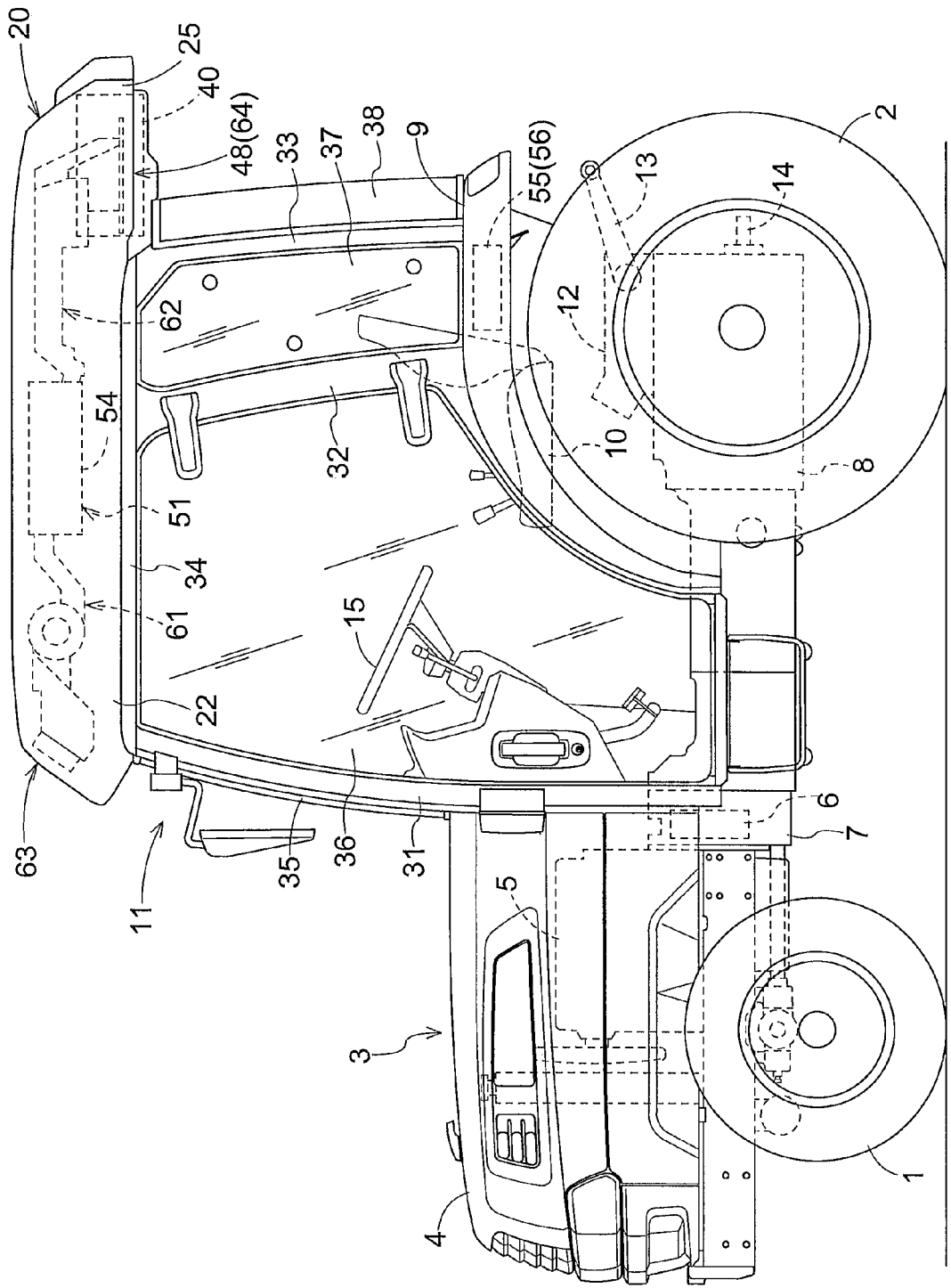
FIG. 1 is an overall side view of a tractor.

As shown in FIG. 1, a working vehicle according to the present invention is, for example, a hybrid tractor. This tractor includes: a traveling vehicle body 3 having a pair of left and right front wheels 1 that can be steered (turned) and a pair of left and right rear wheels 2; a diesel engine 5 that is disposed inside an engine hood 4 in the front portion of the traveling vehicle body 3, and a generator motor 6 (an exemplary electrically-driven motor) that is disposed behind the engine 5. The generator motor 6 (corresponding to the electrically-driven motor) is accommodated in a transmission housing 7, and a transmission case 8 (corresponding to the traveling transmission system) is linked to the rear face of the transmission housing 7. The rear portion of the traveling vehicle body 3 is provided with left and right rear fenders 9 that extend laterally outward from the traveling vehicle body 3 so as to cover the left and right rear wheels 2 from above. A driver's seat 10 is provided between the left and right rear fenders 9. This tractor includes a cabin 11 that forms a driver's space accommodating the driver's seat 10.

The rear portion of the traveling vehicle body 3 (on the rear end side of the transmission case 8) is provided with a hydraulic elevation cylinder 12 that functions as an actuator for vertical movement, and a pair of left and right lift arms 13 that are vertically swung according to actuation by the elevation cylinder 12. The rear end of the transmission case 8 is provided with a power take-off shaft 14 that can take driving power to the outside. Accordingly, the link to a ground work apparatus such as a rotary tiller or a plow can be established via a three-point link mechanism (not shown) that can be vertically moved by the left and right lift arms 13, and, thus, driving power from the power take-off shaft 14 can be transmitted to the drive-type ground work apparatus such as a rotary tiller, thereby performing plowing.

Figure 2:
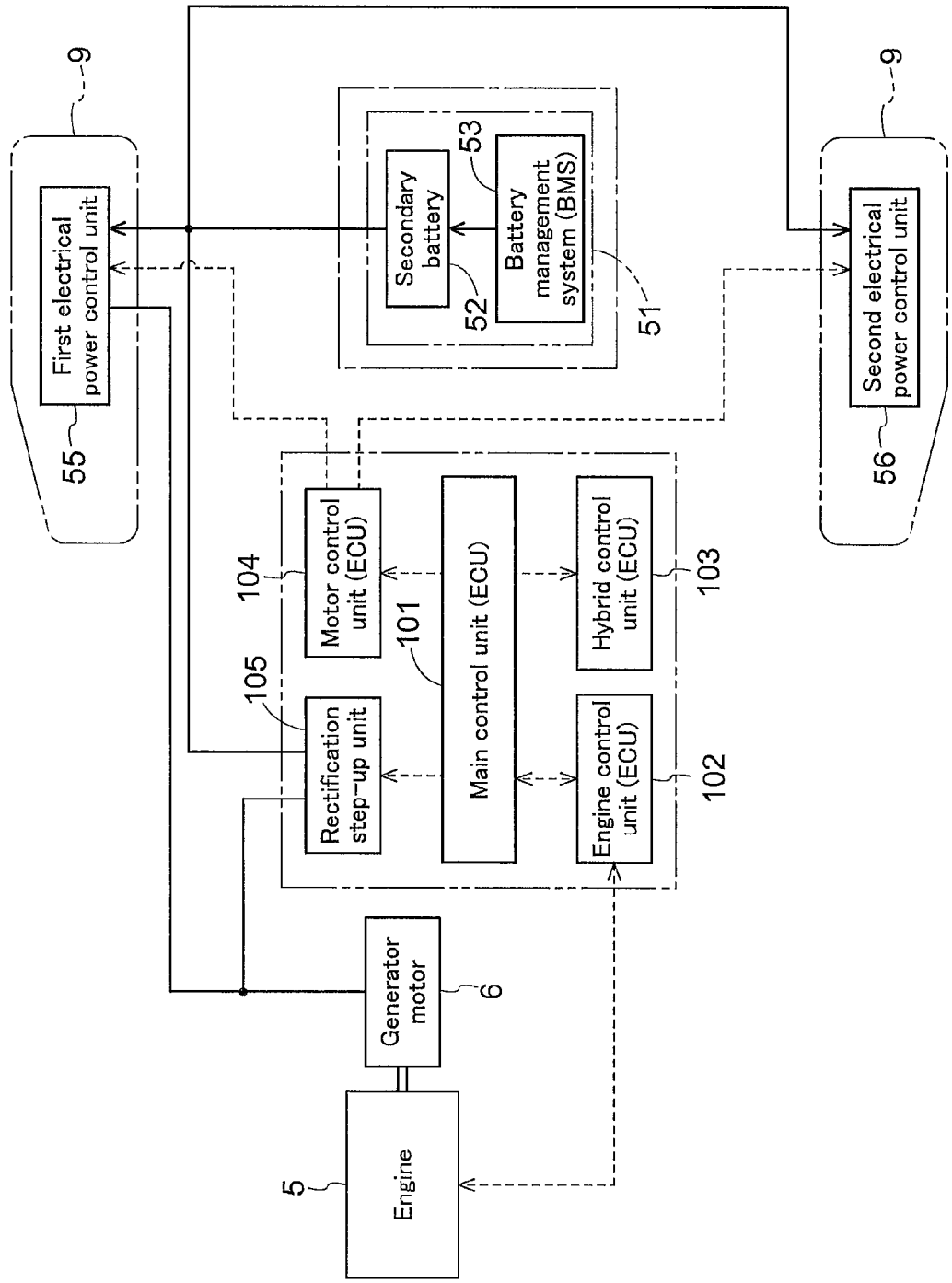
FIG. 2 is a block diagram of a control system for the tractor.

This tractor uses the generator motor 6 (corresponding to the electrically-driven motor) having both a function of a 3-phase AC generator that generates electricity using the driving power of the engine 5 and a function of a 3-phase AC motor that is actuated to rotate by electrical power supplied from the outside. Furthermore, as shown in FIGS. 1 and 2, a power source unit 51 that has a secondary battery 52 (battery) of a lithium ion type, a nickel metal-hydride type, or the like and a battery management system 53 is provided inside a roof portion 20 of the cabin 11. A first electrical power control unit 55 that converts a direct current from the power source unit 51 into a 3-phase alternating current and supplies it to the generator motor 6 and a second electrical power control unit 56 that drives the hydraulic system are arranged apart from each other on the left and right rear fenders 9. Furthermore, a main control system for controlling an operation that converts a 3-phase alternating current generated by the generator motor 6 into a direct current, steps up its voltage, and supplies it to the power source unit 51, and for controlling the first and the second electrical power control units 55 and 56 is disposed below the driver's seat 10.

[Main Control System]

As shown in FIG. 2, the main control system includes a main control unit 101, an engine control unit 102, a hybrid control unit 103, a motor control unit 104, and a rectification step-up unit 105, and they are configured as ECUs. This main control system functions as charge-discharge means, and is configured so as to select a charge mode in which the electrical power generated by the generator motor 6 is charged to the secondary battery 52 of the power source unit 51 when the load acting on the traveling transmission system is small, and to select a drive mode in which the electrical power from the power source unit 51 is converted by the first electrical power control unit 55 into a 3-phase alternating current and is supplied to the generator motor 6 when the load acting on the traveling transmission system exceeds a threshold value. In the drive mode, the rotation of the engine is assisted by transmitting the driving power of the generator motor 6 to the traveling transmission system so that the vehicle travels without power shortage or engine stop. Note that the traveling transmission system refers to a transmission mechanism such as the transmission case 8 having a function of transmitting the driving power of the engine 5 to the front wheels 1 and the rear wheels 2.

[Cabin]

As shown in FIG. 1, the cabin 11 includes a pair of left and right front pillars 31 in the shape of support columns in the front portion, a pair of left and right intermediate pillars 32 in the shape of support columns in the intermediate portion in the front-to-rear direction, a pair of left and right rear pillars 33 in the shape of support columns in the rear portion, top frames 34 that link upper portions of these pillars, and the roof portion 20 that is disposed so as to cover the top frames 34. A windshield 35 is provided in the front portion of the cabin 11 so as to be sandwiched by the left and right front pillars 31, glass doors 36 that can be opened and closed are provided on both side portions each between the front pillar 31 and the intermediate pillar 32, side glasses 37 are each provided behind the door 36 between the intermediate pillar 32 and the rear pillar 33, and a rear glass 38 is provided in the rear portion so as to be sandwiched by the left and right rear pillars 33. The pair of left and right front pillars 31, the pair of left and right intermediate pillars 32, and the pair of left and right rear pillars 33 are each made of a steel member having a C-shaped cross-section, and the top frames 34 are fixed by welding to the upper ends of these pillars.

Inside the cabin 11, a steering wheel 15 that steers the front wheels 1 is disposed in the front portion of the driver's seat 10. Although not shown, various pedals such as a clutch pedal, a brake pedal, and an accelerator pedal are arranged laterally apart from each other below the steering wheel 15 on the right and left sides. Furthermore, although not shown, various levers such as a main transmission lever that changes the speed of the transmission case 8 and an elevation lever that controls the elevation cylinder 12 are arranged in a side portion of the driver's seat 10.

Figure 3:
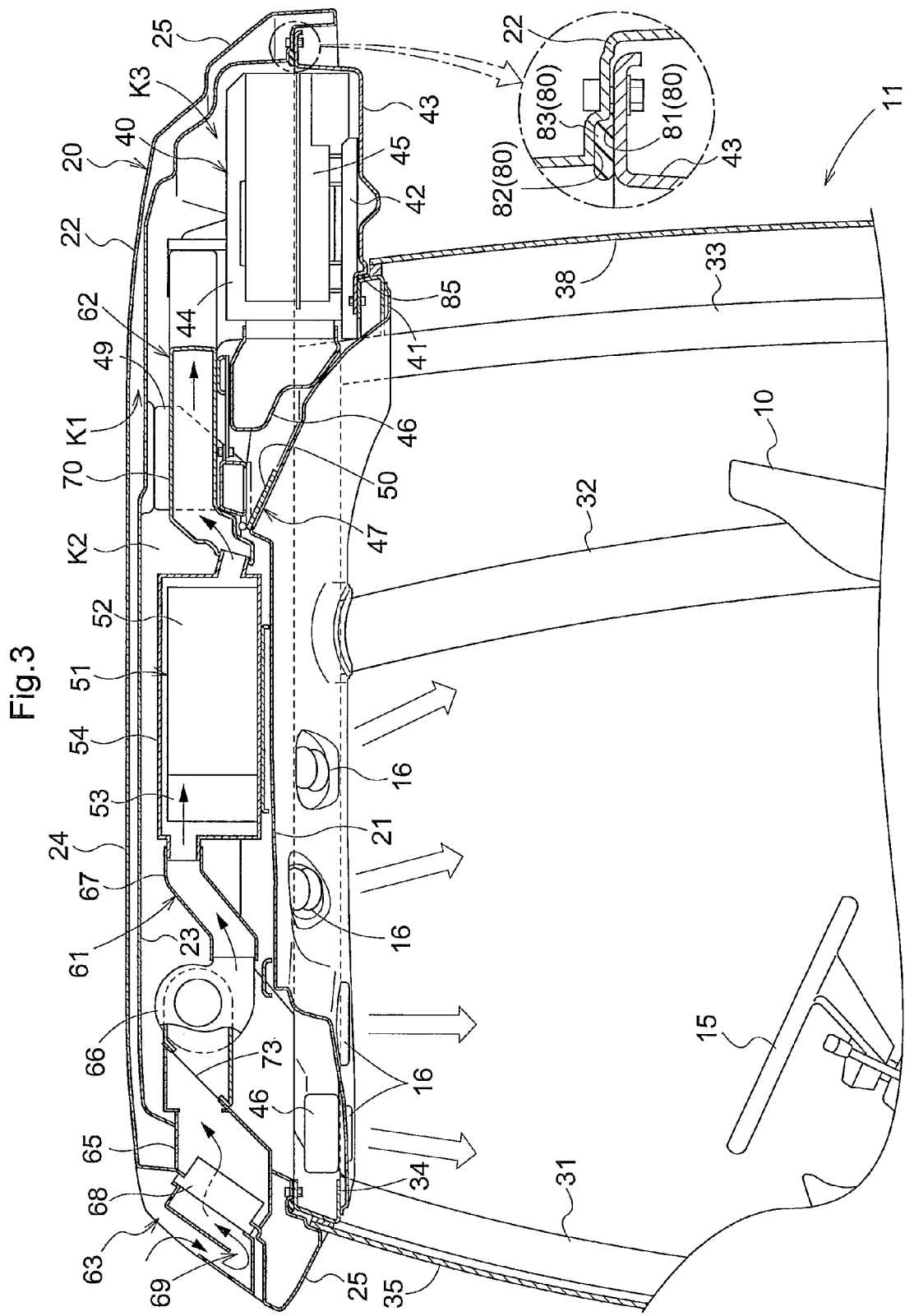
FIG. 3 is a vertical cross-sectional side view of a roof portion.

The cabin 11 has an air-tight structure that prevents dust, noise, and the like in the outside from entering the driver's space. As shown in FIGS. 1 and 3, the power source unit 51 is disposed in a portion close to the center of the roof portion 20, and an air conditioning apparatus 40 that performs cooling and heating of the cabin 11 is disposed in the rear portion of the roof portion 20.

[Configuration of the Roof Portion]

Figure 7:
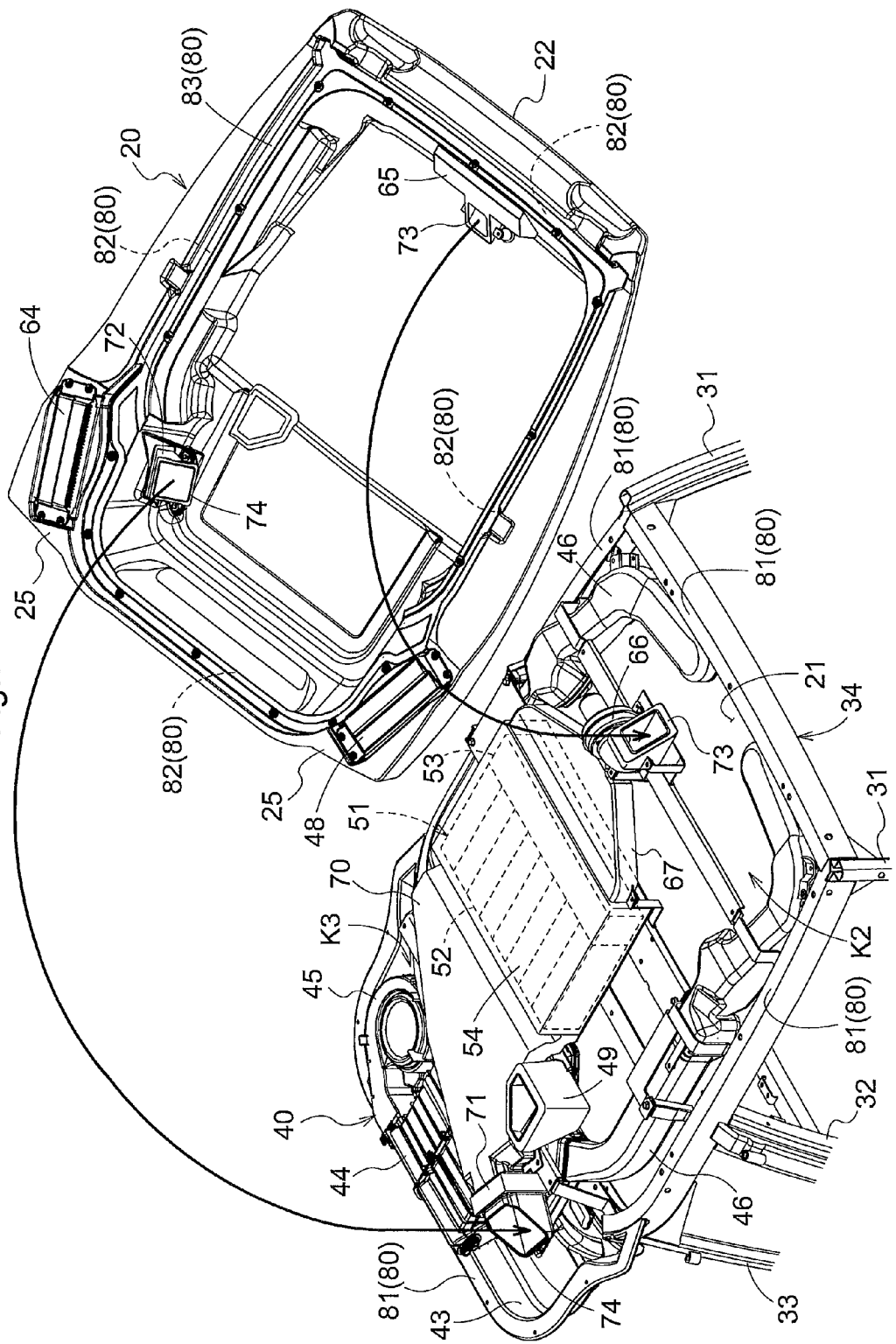
FIG. 7 is a perspective view of the roof portion from which an outer roof has been detached.

As shown in FIG. 3, the roof portion 20 includes an inner roof 21 that is disposed on the lower side and an outer roof 22 that is disposed on the upper side. The inner roof 21 is supported on the top frames 34, and is configured as a ceiling wall of the cabin 11. In a planar view, the center portion of the inner roof 21 has an upward convex shape, and, thus, the seating space inside the cabin 11 is widened to all extent possible. The outer roof 22 includes a lower wall portion 23 and an upper wall portion 24 that are spaced away from each other in the vertical direction, and has a double-layered structure in which a hollow space K1 is formed between the lower wall portion 23 and the upper wall portion 24. As shown in FIGS. 3 and 7, the outer roof 22 is formed so as to have a recess portion that is recessed upward at the center portion, and includes a projection portion 25 that is projected outward from the cabin 11 in a planar view. The projection portion 25 is formed so as to be projected from the cabin 11 on both sides in the vehicle body width direction and on both sides in the vehicle body front-to-rear direction.

In order to arrange the air conditioning apparatus 40 and the power source unit 51 in the roof portion 20, an accommodation space K2 for accommodating the power source unit 51 and an air conditioner accommodation space K3 for accommodating the air conditioning apparatus 40 are formed inside the roof portion 20. As shown in FIG. 7, the outer roof 22 is placed from above on the top frames 34 so as to cover the entire upper portion of the inner roof 21, and, thus, the accommodation space K2 is formed between the inner roof 21 and the outer roof 22. Furthermore, together with a lower cover 43 that is provided in the rear end portion of the inner roof 21, the air conditioner accommodation space K3 is formed between the inner roof 21, the outer roof 22, and the lower cover 43. The accommodation space K2 is formed in a portion close to the center in the vehicle body front-to-rear direction, and the air conditioner accommodation space K3 is formed in a portion close to the rear in the vehicle body front-to-rear direction.

[Air Conditioning Configuration of the Cabin]

As shown in FIG. 3, the air conditioning apparatus 40 is disposed in the rear end portion of the roof portion 20 extending rearward behind the rear pillars 33. A lateral frame 41 is disposed connecting the pair of left and right rear pillars 33 at an arrangement height lower than the upper end of the pair of left and right rear pillars 33 (see FIG. 8), and a support stay 42 that extends rearward is provided on the upper face of the lateral frame 41. The air conditioning apparatus 40 is supported on the support stay 42. The lower cover 43 is disposed connecting the lateral frame 41 and the rear end portion of the outer roof 22, and the lower cover 43 is configured so as to cover the air conditioning apparatus 40 from the rear and below. Accordingly, the air conditioner accommodation space K3 for accommodating the air conditioning apparatus 40 is formed by the rear end portion of the inner roof 21, the portion close to the rear of the outer roof 22, and the lower cover 43.

Figure 4:
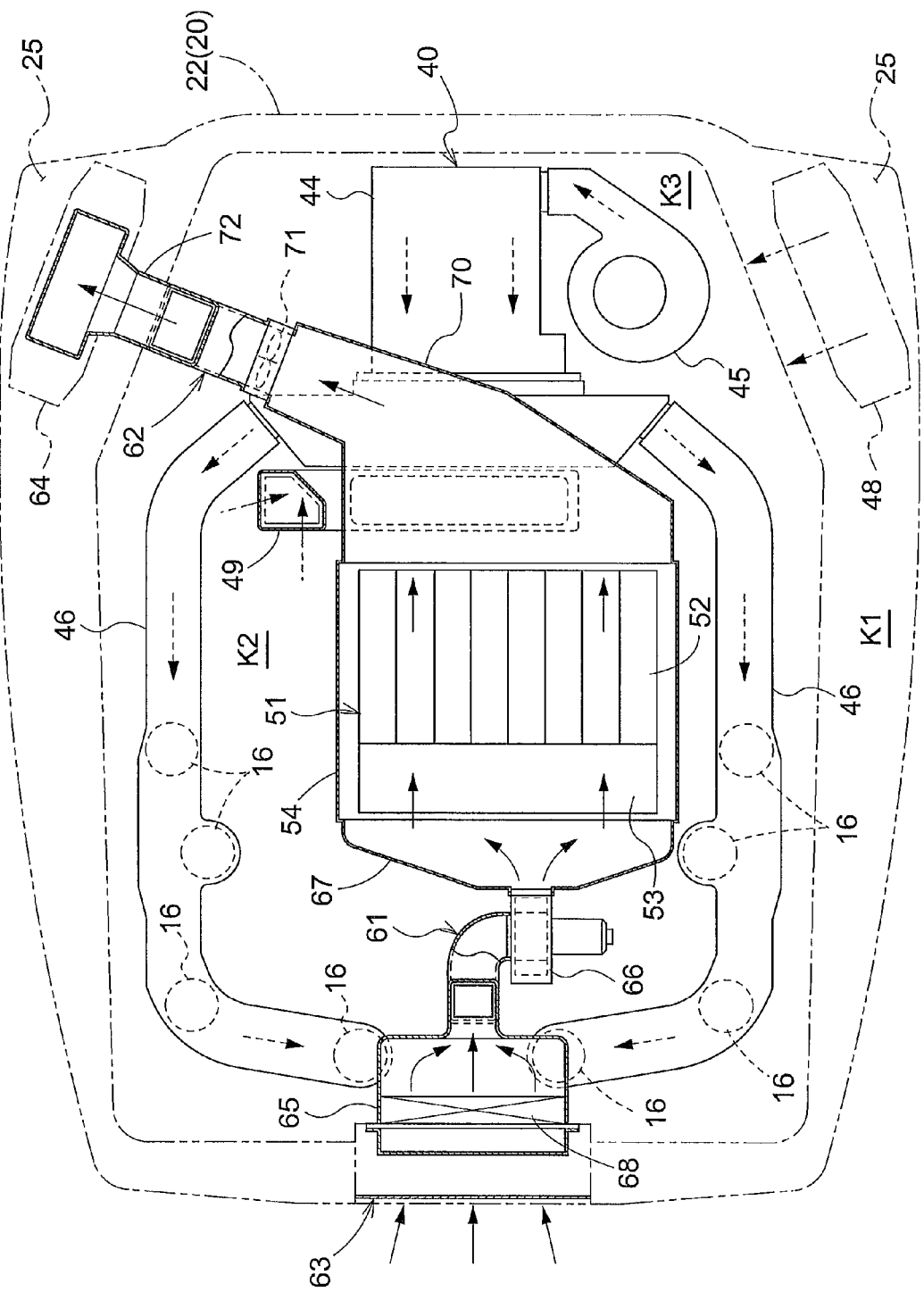
FIG. 4 is a plan view of the roof portion.

As shown in FIG. 4, the air conditioning apparatus 40 includes an air conditioning unit 44 that internally has an evaporator and an electric heater (not shown), and an air blowing fan 45 that blows air into the air conditioning unit 44. The air conditioning unit 44 is disposed in the center portion in the vehicle body width direction, and the air blowing fan 45 is disposed on the left side adjacent to the air conditioning unit 44 in the vehicle body width direction. The configuration is such that air inside the cabin 11, or air containing air inside the cabin 11 and air outside the cabin 11 in a mixed manner is supplied to the air conditioning apparatus 40, the condition of the air is altered by the air conditioning apparatus 40, and air-conditioned air whose condition has been altered by the air conditioning apparatus 40 is supplied via air-conditioned air supply passages 46 (air conditioning ducts) to the cabin 11.

As shown in FIG. 3, in order to supply air inside the cabin 11 to the air conditioning apparatus 40, an indoor air supply port 47 is provided in a portion extending obliquely downward and close to the rear of the inner roof 21. The indoor air supply port 47 interconnects the interior portion of the cabin 11 and the air conditioner accommodation space K3, and air inside the cabin 11 is supplied via the indoor air supply port 47 to the air conditioner accommodation space K3.

Figure 6:
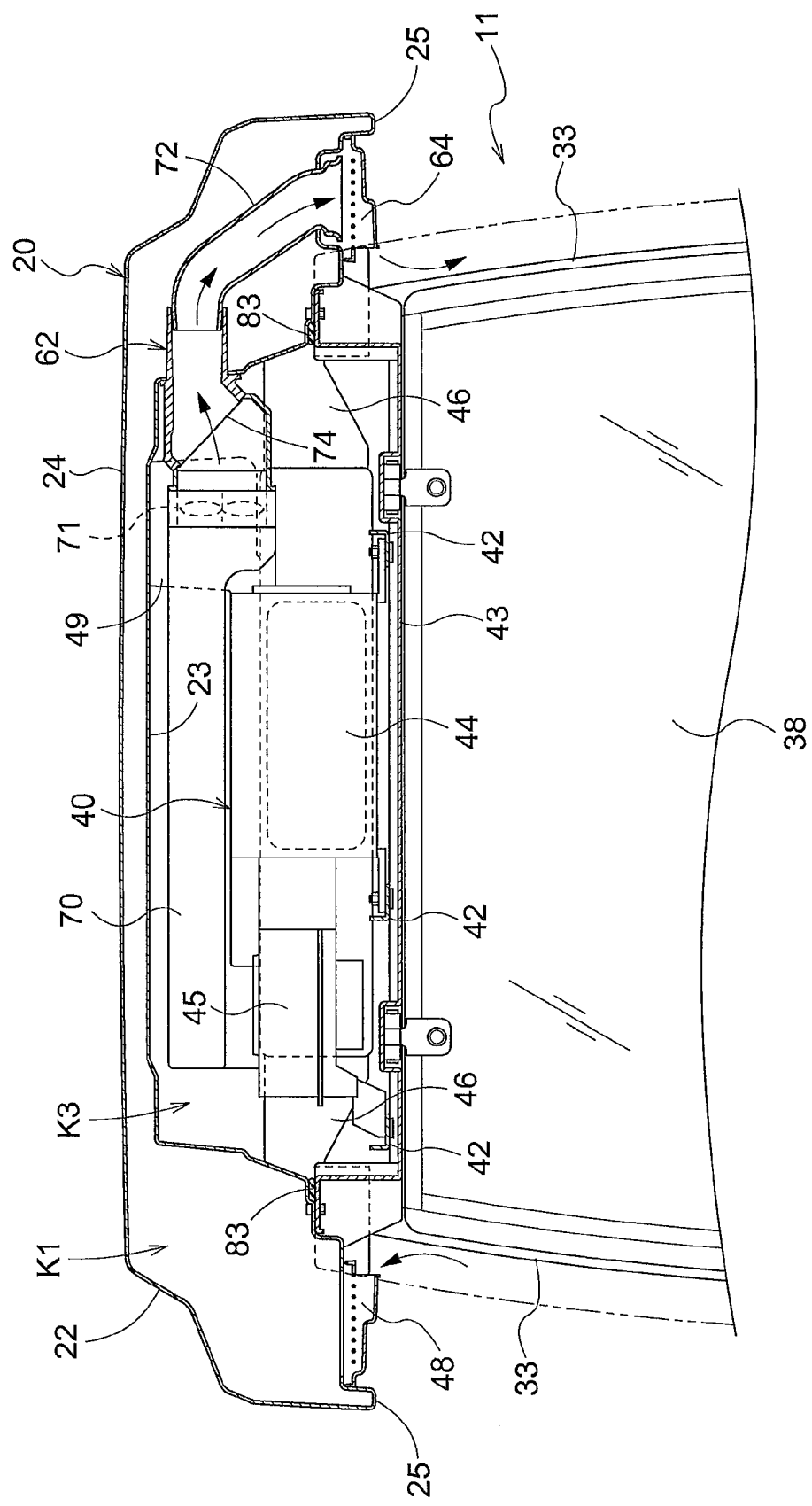
FIG. 6 is a vertical cross-sectional rear view of the roof portion in a portion close to the rear in the vehicle body front-to-rear direction.

As shown in FIGS. 4 and 6, in order to supply air outside the cabin 11 to the air conditioning apparatus 40, an outside air supply port 48 is provided in the projection portion 25 of the outer roof 22 projected to the rear left side. The outside air supply port 48 interconnects the exterior portion of the cabin 11 and the hollow space K1 in the outer roof 22, and air outside the cabin 11 is supplied via the outside air supply port 48 to the hollow space K1. The outside air supply port 48 is formed such that its opening is oriented downward, and, thus, rainwater and the like are prevented from entering the hollow space K1. As shown in FIG. 3, an interconnecting duct 49 that extends in the vertical direction is provided in a portion close to the rear of the roof portion 20, and the interconnecting duct 49 interconnects the hollow space K1 and the air conditioner accommodation space K3 in the outer roof 22. Accordingly, air outside the cabin 11 is supplied via the outside air supply port 48 to the hollow space K1 in the outer roof 22, and is supplied from the hollow space K1 via the interconnecting duct 49 to the air conditioner accommodation space K3.

In order to supply air inside the cabin 11 to the air conditioning apparatus 40, a vertically swingable shutter 50 is provided that is configured so as to be capable of switching the state between a state in which only air inside the cabin 11 is supplied and a state in which air containing air inside the cabin 11 and air outside the cabin 11 in a mixed manner is supplied. The interconnecting duct 49 is disposed such that its lower opening opposes the indoor air supply port 47 in the vertical direction. The shutter 50 can open and close the lower opening of the interconnecting duct 49 through the vertical swinging movement. When the shutter 50 closes the lower opening of the interconnecting duct 49 as indicated by the broken line in FIG. 3, the state is realized in which only air inside the cabin 11 is supplied to the air conditioning apparatus 40. When the shutter 50 is switched so as to open the lower opening of the interconnecting duct 49 as indicated by the solid line in FIG. 3, the state is realized in which air containing air inside the cabin 11 and air outside the cabin 11 in a mixed manner is supplied to the air conditioning apparatus 40.

As shown in FIG. 4, the air-conditioned air supply passages 46 are for supplying air-conditioned air whose condition has been altered by the air conditioning unit 44 to the cabin 11, and are respectively arranged in both end portions in the vehicle body width direction. The air-conditioned air supply passages 46 are arranged so as to extend from the rear to the front in the vehicle body front-to-rear direction, and are configured so as to supply air-conditioned air to the cabin 11 via a plurality of ejection ports 16 that are arranged at an interval in the vehicle body front-to-rear direction.

[Configuration for Accommodating the Power Source Unit]

The secondary battery 52 of the power source unit 51 has a configuration in which a plurality of cells functioning as batteries are electrically connected, and is disposed in a portion close to the center in both the vehicle body width direction and the vehicle body front-to-rear direction of the roof portion 20. The battery management system 53 is disposed near and in front of the secondary battery 52. As described above, the accommodation space K2 for accommodating the power source unit 51 is formed between the inner roof 21 and the outer roof 22 by placing the outer roof 22 so as to cover the entire upper portion of the inner roof 21. The accommodation space K2 includes an accommodation case 54 for accommodating the power source unit 51.

Figure 5:
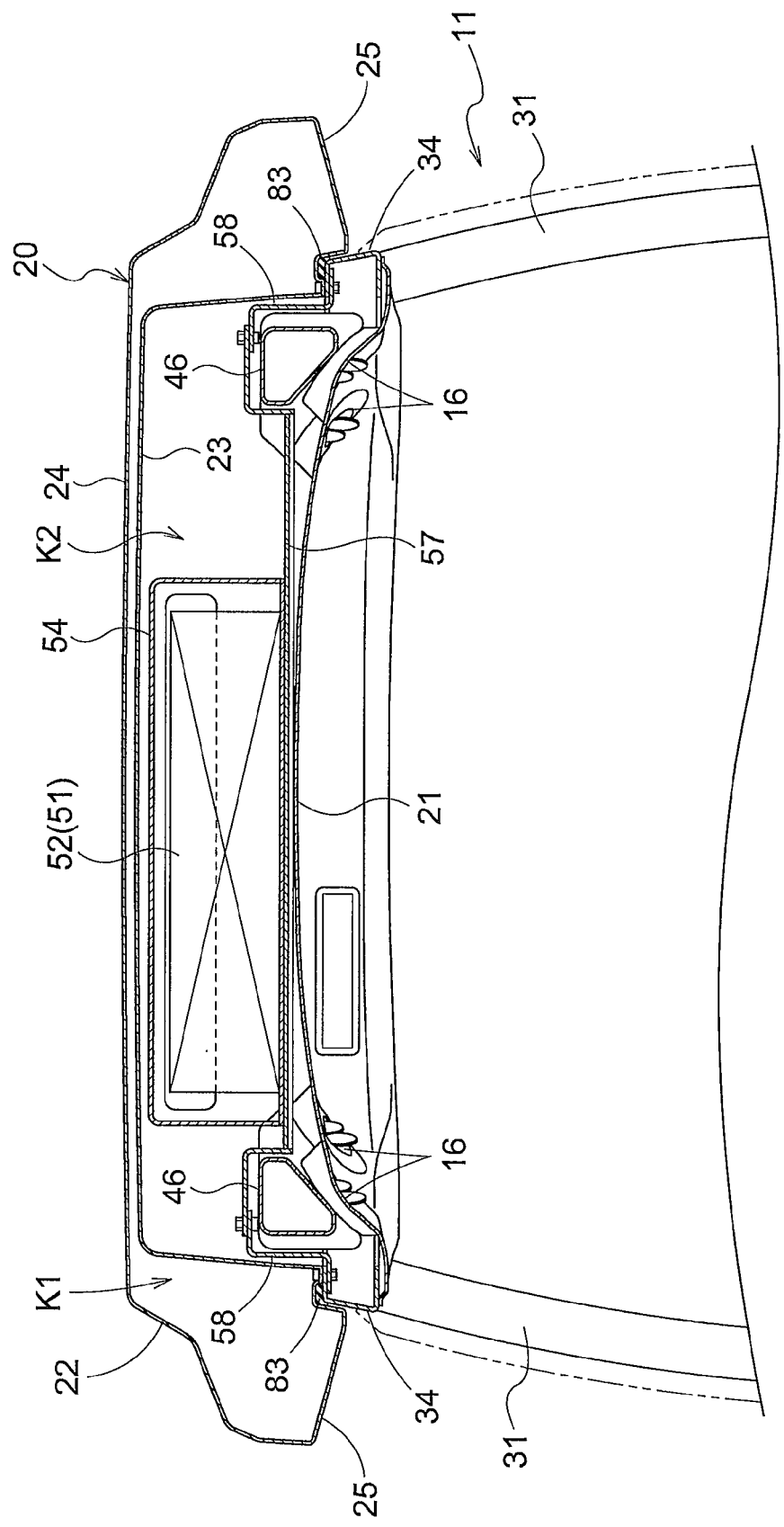
FIG. 5 is a vertical cross-sectional rear view of the roof portion in a portion close to the center in the vehicle body front-to-rear direction.

As shown in FIG. 5, the power source unit 51 is supported on the upper face of a plate-like first case support member 57 (corresponding to the support member) that extends in the vehicle body width direction. The first case support member 57 is disposed connecting second case support members 58 that are linked to the left and right top frames 34, and is positioned such that the support face of the first case support member 57 supporting the power source unit 51 is lower than the upper end portion of the air-conditioned air supply passages 46 that are respectively arranged in both end portions in the vehicle body width direction. Thus, as shown in FIG. 4, the power source unit 51 accommodated in the accommodation case 54 is positioned effectively using a space between the air-conditioned air supply passages 46 in a planar view, and, as shown in FIG. 5, the height of the portion of the power source unit 51 projected upward is reduced to all extent possible with respect to the air-conditioned air supply passages 46.

[Mechanism for Cooling Down the Power Source Unit]

In order to suppress an increase in the temperature in the secondary battery 52, the power source unit 51 includes a cooling mechanism that takes air outside the cabin 11 and supplies it as cooling air to the secondary battery 52 and the battery management system 53. This cooling mechanism is disposed in the roof portion 20.

As shown in FIGS. 3 and 4, as the cooling mechanism, the roof portion 20 includes an air intake passage 61 through which air outside the cabin 11 is supplied to the power source unit 51 and an air exhaust passage 62 through which air supplied to the power source unit 51 is exhausted out of the roof portion 20. The air intake passage 61 guides air taken from an air intake port 63 provided in the center portion in the vehicle body width direction to the power source unit 51, and is formed in the shape of a straight line along the vehicle body front-to-rear direction. The air exhaust passage 62 guides air from the power source unit 51 to an air exhaust port 64 provided in one of the end portions (a right end portion) in the vehicle body width direction, and is formed so as to be bent in a planar view. Air outside the cabin 11 is supplied via the air intake port 63 to the air intake passage 61, flows rearward inside the roof portion 20 along the air intake passage 61, and is supplied as cooling air to the accommodation case 54. Then, air supplied to the accommodation case 54 is supplied from the rear end portion of the accommodation case 54 to the air exhaust passage 62, flows obliquely to the right rear in a planar view inside the roof portion 20 along the air exhaust passage 62, and is exhausted via the air exhaust port 64 out of the roof portion 20.

The air intake port 63 is disposed in the center portion in the vehicle body width direction of the front face portion of the outer roof 22, and is formed in a laterally long shape with its opening oriented forward. The air intake passage 61 includes, sequentially from upstream in the air flow direction, a first channel section 65 that has a portion extending rearward whose channel width is the same as the opening width of the air intake port 63 and a subsequent portion whose channel width is reduced to the center side in the vehicle body width direction in a planar view, a front fan 66, and a second channel section 67 whose channel width is increased toward the rear in a planar view. The first channel section 65 includes an air filter 68, and is configured such that its rear end portion is connected to the intake portion of the front fan 66. The second channel section 67 is configured such that its front end portion is connected to the ejection portion of the front fan 66, and its rear end portion is connected to the front face portion of the accommodation case 54.

As shown in FIG. 3, the upstream end portion in the air flow direction of the air intake passage 61 includes a bent channel section 69 that folds back the air flow direction from downward to upward. The bent channel section 69 prevents rainwater and the like from entering the air intake passage 61. Furthermore, although not shown, the folded back portion of the bent channel section 69 that folds back the air flow direction from downward to upward has a hole for discharging trapped rainwater and the like downward.

The air exhaust passage 62 includes, sequentially from upstream in the air flow direction, a third channel section 70 that has a portion extending rearward whose channel width is the same as the width of the accommodation case 54 in a planar view and a subsequent inclined portion changing the air flow direction obliquely to the right rear in a planar view, a rear fan 71, and a fourth channel section 72 that guides air from the rear fan 71 to the air exhaust port 64. The air exhaust port 64 is disposed in the projection portion 25 of the outer roof 22 projected from the cabin 11 rightward in the vehicle body width direction on the rear side in the vehicle body front-to-rear direction, and is formed such that its opening is oriented downward, thereby preventing rainwater and the like from entering the air exhaust passage 62.

Incidentally, a sirocco fan that is rotationally driven about a left-to-right axis is used as the front fan 66, and an axial fan that is rotationally driven about a front-to-rear axis is used as the rear fan 71. It is also possible that the cooling mechanism includes only one of the front fan 66 and the rear fan 71.

In this manner, in the roof portion 20, both the air conditioning apparatus 40 and the power source unit 51 are arranged in a portion close to the center in the vehicle body width direction, and, in addition to the air conditioning apparatus 40, the cooling mechanism having the air intake passage 61 and the air exhaust passage 62 for cooling down the power source unit 51 is also included. Since the air exhaust passage 62 is bent away from the air conditioning apparatus 40 in a planar view, the air conditioning apparatus 40 and the cooling mechanism are hardly positioned one above the other in the vertical direction, and, thus, the vehicle height of the vehicle body can be reduced to all extent possible. Furthermore, the channel for circulating air between the air conditioning apparatus 40 and the interior portion of the cabin 11 for air conditioning and the channel, and the channel for causing air to flow including the air intake passage 61 and the air exhaust passage 62 for cooling down the power source unit 51 are separately arranged in the roof portion 20. Accordingly, air that has cooled down the power source unit 51 is not supplied to the air conditioning apparatus 40, and, conversely, air-conditioned air whose condition has been altered by the air conditioning apparatus 40 is not supplied to the power source unit 51, and, thus, both air conditioning of the cabin 11 and cooling down of the power source unit 51 can be properly performed while effectively using the roof portion 20 as an installation space of the channels. Moreover, as described above, the support face of the first case support member 57 supporting the power source unit 51 is positioned lower than the upper end portion of the air-conditioned air supply passages 46, and, thus, the vehicle height of the vehicle body can be further reduced.

[Configuration Connecting the Air Intake Passage and the Air Exhaust Passage]

The air intake passage 61 is configured such that it can be divided into an inner channel section that is disposed on the inner roof 21 side and an outer channel section that is disposed on the outer roof 22 side. Furthermore, as in the case of the air intake passage 61, the air exhaust passage 62 is configured such that it can be divided into an inner channel section that is disposed on the inner roof 21 side and an outer channel section that is disposed on the outer roof 22 side.

As shown in FIGS. 3 and 7, the air intake passage 61 includes, on the outer roof 22 side, the first channel section 65 (corresponding to the outer channel section) such that it is interconnected to the air intake port 63, and, on the inner roof 21 side, the front fan 66 and the second channel section 67 (corresponding to the inner channel section) such that the ejection portion of the front fan 66 is interconnected to the second channel section 67, and the second channel section 67 is interconnected to the accommodation case 54. Furthermore, as shown in FIGS. 6 and 7, the air exhaust passage 62 includes, on the inner roof 21 side, the third channel section 70 and the rear fan 71 (corresponding to the inner channel section) such that the third channel section 70 is interconnected to the intake portion of the rear fan 71, and, on the outer roof 22 side, the fourth channel section 72 (corresponding to the outer channel section) such that it is interconnected to the air exhaust port 64.

The channels of the air intake passage 61 and the air exhaust passage 62 are formed by connecting the inner channel sections and the outer channel sections. The inner channel sections and the outer channel sections of the air intake passage 61 and the air exhaust passage 62 are connected to each other by placing the outer roof 22 from above on the top frames 34 so as to cover the entire upper portion of the inner roof 21. That is to say, merely by placing the outer roof 22 so as to cover the upper portion of the inner roof 21, the first channel section 65 (the outer channel section) and the front fan 66 (the inner channel section) in the air intake passage 61 are connected to each other, and the rear fan 71 (the inner channel section) and the fourth channel section 72 (the outer channel section) in the air exhaust passage 62 are connected to each other.

As shown in FIGS. 3 and 7, air intake-side connecting portions 73 between the first channel section 65 (the outer channel section) and the front fan 66 (the inner channel section) in the air intake passage 61 are each formed in the shape of an inclined face that is inclined with respect to the vertical direction, which is a placement direction in which the outer roof 22 is placed so as to cover the entire upper portion of the inner roof 21. As shown in FIGS. 6 and 7, air exhaust-side connecting portions 74 between the rear fan 71 (the inner channel section) and the fourth channel section 72 (the outer channel section) in the air exhaust passage 62 are also each formed in the shape of an inclined face that is inclined with respect to the vertical direction. Accordingly, even if the first channel section 65 (the outer channel section) and the front fan 66 (the inner channel section) in the air intake passage 61 are displaced from each other when placing the outer roof 22 on the upper portion of the inner roof 21, the outer roof 22 is guided to a proper position along the inclined air intake-side connecting portions 73, and, thus, the first channel section 65 (the outer channel section) and the front fan 66 (the inner channel section) can be properly connected to each other. Furthermore, the rear fan 71 (the inner channel section) and the fourth channel section 72 (the outer channel section) in the air exhaust passage 62 also can be properly connected to each other because the outer roof 22 is guided to a proper position along the inclined air exhaust-side connecting portions 74.

Note that, in the air intake-side connecting portions 73 and the air exhaust-side connecting portions 74, a sealing member may be interposed between the outer channel section and the inner channel section in the air intake passage 61 and the air exhaust passage 62 in order to improve sealing properties.

[Sealing Structure]

As described above, the outer roof 22 is placed so as to cover the entire upper portion of the inner roof 21, and, thus, the accommodation space K2 and the air conditioner accommodation space K3 are formed between the inner roof 21, the lower cover 43, and the outer roof 22. In order to prevent rainwater and the like from entering the accommodation space K2 and the air conditioner accommodation space K3, a first sealing structure 80 is provided between the outer roof 22 and the top frames 34 and between the outer roof 22 and the lower cover 43.

As shown in FIGS. 3 and 7, the first sealing structure 80 includes lower sealing face portions 81 that are provided on the top frames 34 side and the lower cover 43 side, an upper sealing face portion 82 that is provided on the outer roof 22 side, and a sealing member 83 that is provided between the lower sealing face portions 81 and the upper sealing face portion 82. The lower sealing face portions 81 are formed so as to have a flat face that is continuous on the upper end portion of the top frames 34 at the same height across a portion extending in the vehicle body width direction in the front end portion in the vehicle body front-to-rear direction and portions extending in the vehicle body front-to-rear direction in both end portions in the vehicle body width direction. A groove portion that is continuous at the same height is formed so as to surround the upward recess portion close to the center of the outer roof 22, and the bottom portion of this groove portion is configured as the upper sealing face portion 82. The sealing member 83 is formed continuous in the longitudinal direction of the upper sealing face portion so as to be fitted to the groove portion forming the upper sealing face portion 82.

Figure 8:
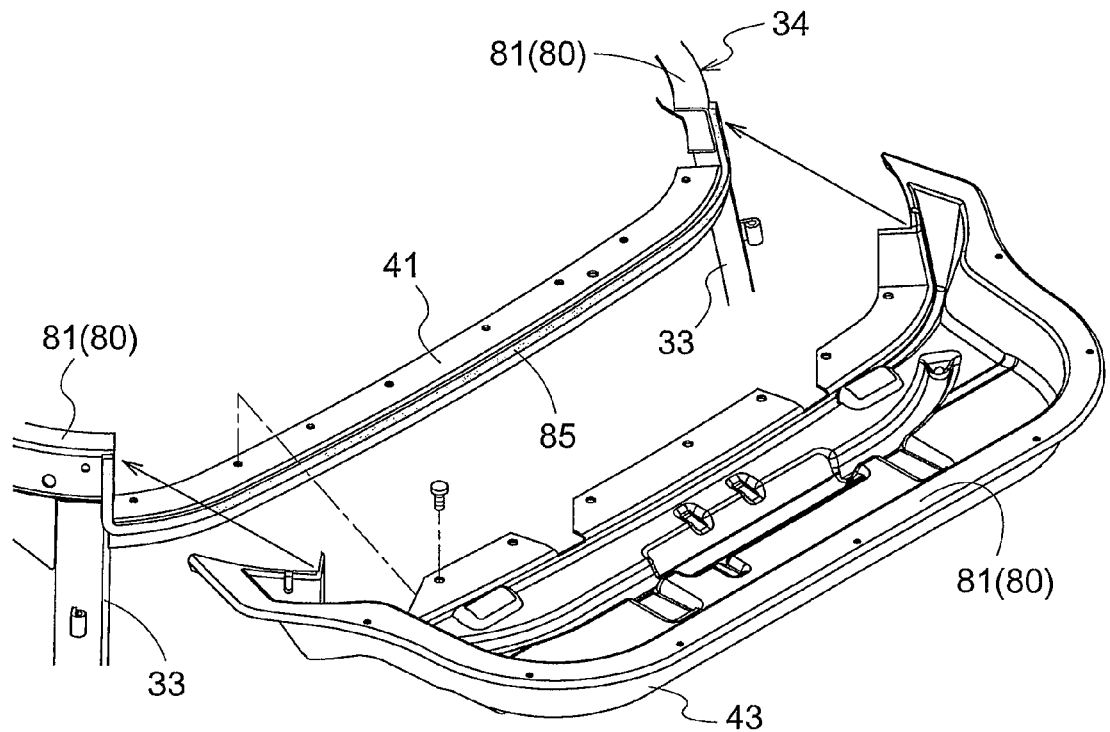
FIG. 8 is a perspective view of a rear end portion of the roof portion.
Figure 9:
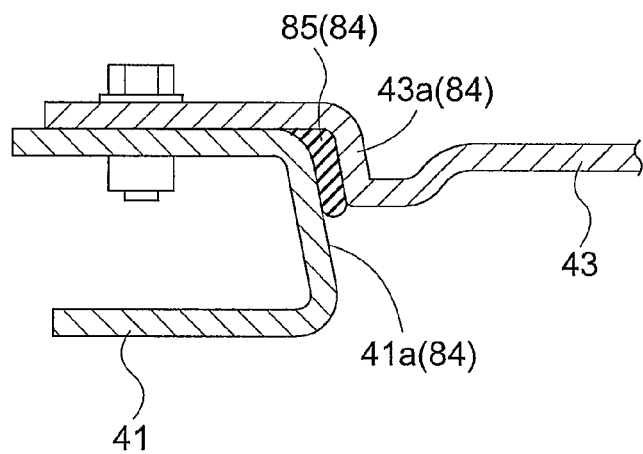
FIG. 9 is a vertical cross-sectional side view of a sealing structure.

Furthermore, as shown in FIGS. 8 and 9, a second sealing structure 84 is provided between the lateral frame 41 and the lower cover 43 forming the air conditioner accommodation space K3. The lateral frame 41 is in the shape of a sideway U when viewed from a side, and its rear wall portion 41a oriented in the rear side is formed so as to be inclined forward toward the upper side. A portion close to the front end of the lower cover 43 is placed on and fastened by bolting or the like to the upper face portion of the lateral frame 41, and, thus, the lower cover 43 is linked to the lateral frame 41. The portion close to the front end of the lower cover 43 is bent so as to form an opposing wall 43a that opposes the rear wall portion 41a of the lateral frame 41 and is inclined in a manner similar to the rear wall portion 41a. In the second sealing structure 84, the rear wall portion 41a of the lateral frame 41 is configured as a front sealing face portion, the opposing wall 43a of the lower cover 43 is configured as a rear sealing face portion, and a sealing member 85 is provided between the rear wall portion 41a and the opposing wall 43a. Furthermore, since the rear wall portion 41a and the opposing wall 43a are inclined, displacement when linking the lateral frame 41 and the lower cover 43 is prevented.

Other Embodiments (1) In the foregoing embodiment, the air exhaust passage 62 is bent obliquely to the right rear in a planar view, but the air exhaust passage 62 may be bent obliquely to the left rear in a planar view. In this case, each of the outside air supply port 48 and the air exhaust port 64 included in the outer roof 22 is disposed on the opposite side in the left-to-right direction.

(2) In the foregoing embodiment, the air conditioning apparatus 40 is disposed in a portion close to the center in the vehicle body width direction behind the power source unit 51 in the vehicle body front-to-rear direction, but constituent components other than the air conditioning apparatus 40 may be disposed in a portion close to the center in the vehicle body width direction behind the power source unit 51 in the vehicle body front-to-rear direction. Also in this case, the air exhaust passage 62 can be bent away from the other constituent components in a planar view.

(3) In the foregoing embodiment, the air exhaust port 64 is configured to exhaust air downward, but, for example, an air exhaust port may be provided in a side portion of the outer roof 22, and may be configured to exhaust air along the vehicle body width direction.

(4) In the foregoing embodiment, an example is shown in which the working vehicle is applied to a tractor, but may be applied to other various working vehicle.

What is claimed is:

1. A working vehicle, comprising:
a power source unit; an electrically-driven motor that operates with electrical power from the power source unit;
a traveling transmission system to which motive power of the electrically-driven motor is transmitted;
a cabin in which a driver rides and that has a roof portion;
an air intake passage through which air outside the cabin is supplied to the power source unit; and an air exhaust passage through which air supplied to the power source unit is exhausted out of the roof portion;
wherein the power source unit, the air intake passage, and the air exhaust passage are arranged inside the roof portion, the power source unit is disposed in a portion close to a center in a vehicle body width direction, the air intake passage guides air taken from an air intake port that is provided in a center portion in the vehicle body width direction, to the power source unit, and the air exhaust passage is bent in a planar view such that air supplied to the power source unit flows in a bent manner toward an air exhaust port that is provided in one end portion in the vehicle body width direction.

2. The working vehicle according to claim 1, wherein the roof portion has a projection portion that is projected outward in the vehicle body width direction from the cabin in a planar view, and the air exhaust port exhausts air downward in the projection portion of the roof portion.

3. The working vehicle according to claim 1, wherein the roof portion is provided with an air conditioning apparatus that supplies air-conditioned air to the cabin, the air conditioning apparatus is disposed in a portion close to the center in the vehicle body width direction behind the power source unit in a vehicle body front-to-rear direction, and the air exhaust passage is bent away from the air conditioning apparatus in a planar view.

4. The working vehicle according to claim 3, wherein air-conditioned air supply passages that supply air-conditioned air whose condition has been altered by the air conditioning apparatus to the cabin are provided in both end portions in the vehicle body width direction of the roof portion, a support member that supports the power source unit is positioned between the air-conditioned air supply passages so as to be lower than an upper end portion of the air-conditioned air supply passages in a planar view, and the power source unit is supported on an upper portion of the support member.

5. The working vehicle according to claim 1, wherein the roof portion has an inner roof and an outer roof, the outer roof is placed so as to cover an upper portion of the inner roof, so that a space for accommodating the power source unit is formed between the outer roof and the inner roof, and the air intake port and the air exhaust port are arranged in the outer roof, the air intake passage has an inner channel section that is disposed on the inner roof side and an outer channel section that is disposed on the outer roof side, the air exhaust passage has an inner channel section that is disposed on the inner roof side and an outer channel section that is disposed on the outer roof side, and when the outer roof is placed so as to cover the upper portion of the inner roof, the inner channel section and the outer channel section of the air intake passage are connected to each other, and the inner channel section and the outer channel section of the air exhaust passage are connected to each other.

6. The working vehicle according to claim 5, wherein a connecting portion between the inner channel section and the outer channel section of the air intake passage and a connecting portion between the inner channel section and the outer channel section of the air exhaust passage are inclined with respect to a placement direction in which the outer roof is placed on the upper portion of the inner roof.

7. A working vehicle, comprising;
a passenger cabin including a roof, the roof comprising:
a power source disposed at a location substantially central with respect to a left and right direction of the roof;
an air intake port disposed at a location substantially central with respect to the left and right direction of the roof;
an air intake passage configured to connect the air intake port to the power source, the air intake passage being configured to take air from an outside of the roof into the power source,
an exhaust port disposed at a side of the roof; and
an air exhaust passage configured to connect the air exhaust port to the power source, the air exhaust passage being configured to exhaust air from the power source to the outside of the roof, the air exhaust passage being configured to bend towards the air exhaust port such that an air supply to the power source flows towards the air exhaust port.

* * * * *